United States Patent [19]

Yanabu et al.

[11] 4,442,469

[45] Apr. 10, 1984

[54] DC CIRCUIT BREAKER APPARATUS

[75] Inventors: Satoru Yanabu, Tokyo; Tohoru Tamagawa, Chigasaki; Takumi Funahashi, Yokohama, all of Japan

[73] Assignee: Tokyo Shibaura Denki Kabushiki Kaisha, Kanagawa, Japan

[21] Appl. No.: 409,174

[22] Filed: Aug. 18, 1982

[30] Foreign Application Priority Data

Aug. 26, 1981 [JP] Japan ................................ 56-132679

[51] Int. Cl.3 ................................................ H02H 7/22

[52] U.S. Cl. ............................................ 361/4; 361/2

[58] Field of Search .......................... 361/4, 6, 8, 13, 2, 361/3, 5, 7, 9; 307/134, 135

[56] References Cited

U.S. PATENT DOCUMENTS

| | | | |
|---|---|---|---|
| 3,475,620 | 10/1969 | Murray et al. | 361/4 |
| 3,753,042 | 8/1973 | Kind et al. | 361/4 X |
| 3,758,790 | 9/1973 | Kind et al. | 361/3 |
| 4,172,268 | 10/1979 | Yanabu et al. | 361/4 |
| 4,305,107 | 12/1981 | Murano et al. | 361/4 |

*Primary Examiner*—Patrick R. Salce

*Attorney, Agent, or Firm*—Stevens, Davis, Miller & Mosher

[57] ABSTRACT

A DC circuit breaker apparatus comprises a first interrupter and a second interrupter connected in series. A first capacitor and a discharge gap are respectively connected in parallel with the first and second interrupters. An impedance element is connected between a first junction between the first capacitor and the discharge gap and a second function between the first and second interrupter, and a second capacitor is connected in parallel with the second interrupter.

5 Claims, 9 Drawing Figures

DC CIRCUIT BREAKER APPARATUS

BACKGROUND OF THE INVENTION

This invention relates generally to DC circuit breaker apparatus to be used in a DC circuit such as a DC power transmission system, and more particularly to a type thereof including a device (hereinafter termed commutation circuit) which causes a reverse current to flow through the circuit breaker in a direction reverse to that of a normal current flowing through the circuit breaker apparatus.

FIG. 1 illustrates a DC power transmission system including a conventional DC circuit breaker. In the system, an AC/DC converter 1 converts AC into DC and transmits the DC power to an inverter 3 through a DC circuit breaker apparatus 2 which comprises a circuit interrupter 4 and a commutation capacitor 5 parallelly connected with the interrupter 4.

While the interrupter 4 is being closed, a DC current (hereinafter termed main current) $I_0$ flow through the circuit breaker apparatus 2 toward the inverter 3.

However, when the interrupter 4 is opened to interrupt the circuit breaker apparatus 2, an arc voltage created between the contacts of the interrupter 4 increases with time, thereby charging the capacitor 5.

By reason of a negative resistance characteristic of the arc, an arc current flowing between the contacts becomes oscillatory with the amplitude increasing with time as shown in FIG. 2. The osillatory current produces a zero point in the main current $I_0$, and usually the circuit breaker interrupts the main current $I_0$.

In the above described construction of the circuit breaker apparatus 2, however, the capacitance of the capacitor 5 must be increased in accordance with the rated current of the circuit breaker. Thus, a transmission system of a large current rating requires a capacitor of a large capacitance and hence of an excessively large size.

In order to obviate the above described drawback, another DC circuit breaker as shown in FIG. 3 has been proposed, in which circuit elements corresponding to those shown in FIG. 1 are designated by the same reference numerals.

In the circuit breaker shown in FIG. 3, one terminal of the capacitor 5 is grounded through a resistor 6, while the other terminal is connected to the line of the system downstream of the circuit interrupter 4. While the interrupter 4 is held in closed state, the capacitor 5 is charged from the line voltage of the DC circuit or the DC power transmission system.

When the interrupter 4 opens, an electric arc is created between the contacts of the interrupter 4. The voltage across the separated contacts increases according to the elapse of time, and when the voltage exceeds a predetermined value, a discharge gap 7 connected between the converter side of the interrupter 4 and the grounded terminal of the capacitor 5 conducts, thereby causing a discharge current $I_1$ oscillating at a frequency determined by the capacitance of the capacitor 5 to flow through the interrupter 4 in a direction reverse to that of the main current $I_0$.

The discharge current $I_1$ forms a zero point in the main current $I_0$ immediately after the opening of the interrupter 4 as shown in FIG. 4, and at the zero point, the interrupter 4 interrupts the main current $I_0$.

In the above described conventional circuit breaker, the zero point is formed forcibly so as to cause the circuit breaker to positively interrupt current. Furthermore, since the reverse current $I_1$ providing the zero point is created by discharging the capacitor 5 charged from the line voltage of the transmission system, the capacitance of the capacitor 5 required for this example can be substantially reduced from that of the capacitor used in FIG. 1. In the example shown in FIG. 3, however, the charge of the capacitor is determined by the line voltage of the transmission system. Thus, in a case where the circuit breaker is closed at a time when the line voltage is substantially reduced, and when a fault occurs at this time on the transmission system, the capacitor 5 cannot create reverse current of a sufficient intensity, thereby failing to positively interrupt the main current $I_0$. In other words, either one of the DC circuit breakers shown in FIGS. 1 and 3 has various difficulties such as insufficient reliability when it is used practically.

SUMMARY OF THE INVENTION

A primary object of the present invention is to provide a DC circuit breaker apparatus wherein the above described difficulties of the conventional devices can be substantially eliminated.

Another object of the invention is to provide a DC circuit breaker apparatus wherein the capacity and therefore the construction cost of the commutation capacitor can be substantially reduced.

Still another object of the invention is to provide a DC circuit breaker apparatus wherein the commutation capacitor is not beforehand charged by the line voltage of the transmission system.

These and other objects of the present invention can be achieved by a DC circuit breaker apparatus comprising a first interrupter and a second interrupter connected in series in a DC power supply line, a first capacitor and a discharge gap respectively connected in parallel with the first and second interrupters so that the first capacitor and the discharge gap are connected in series, an impedance element connected between a first junction between the first capacitor and the discharge gap, and a second junction between the first and second interrupters, and a second capacitor connected in parallel with the second interrupter.

Preferably the first interrupter may be made of at least one vacuum switch, or a series connection of at least one vacuum switch and a switch other than the vacuum switch having an arc voltage higher than that of the vacuum switch.

The invention will now be described with reference to the accompanying drawings.

DESCRIPTION OF THE PREFERRED EMBODIMENTS

Figure 5:
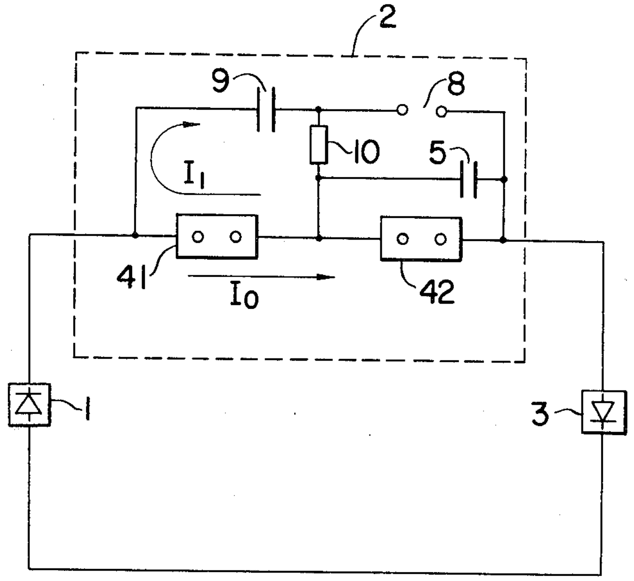
FIG. 5 is a connection diagram showing a first embodiment of the present invention.

Referring now to FIG. 5, there is illustrated a power supplying system comprising an AC/DC converter 1, an inverter 3, and a DC circuit breaker apparatus 2 interposed between the converter 1 and the inverter 3.

According to the present invention, the DC circuit breaker apparatus (hereinafter simply termed circuit breaker) 2 comprises a first interrupter 41 and a second interrupter 42 connected in series in a power line extending between the converter 1 and the inverter 3. A first capacitor 9 is connected in parallel with the first interrupter 41, while a second capacitor 5 and a discharge gap 8 are connected in parallel with the second interrupter 42, so that the first capacitor 9 and the discharge gap 8 are connected in series. Furthermore, an impedance element 10 is connected between a junction between the first and second interrupters 41 and 42, and another junction between the first capacitor 9 and the discharge gap 8.

When the circuit breaker 2 is opened, the interrupters 41 and 42 are both opened, thus creating an arc across contacts of each interrupter, and the arc voltage across the second interrupter 42 is used for charging the capacitor 5.

Figure 1:
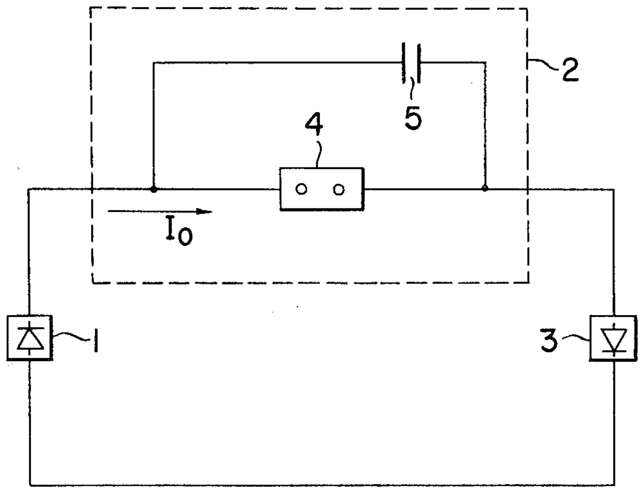
FIG. 1 PRIOR ART
FIG. 1 is a connection diagram showing a conventional DC circuit breaker.
Figure 2:
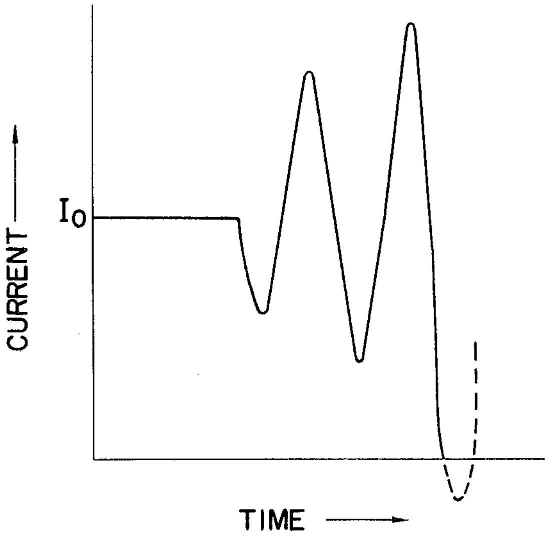
FIG. 2 PRIOR ART
FIG. 2 is a diagram showing a waveform of the current flowing through the circuit breaker shown in FIG. 1 at the time of its interruption.
Figure 3:
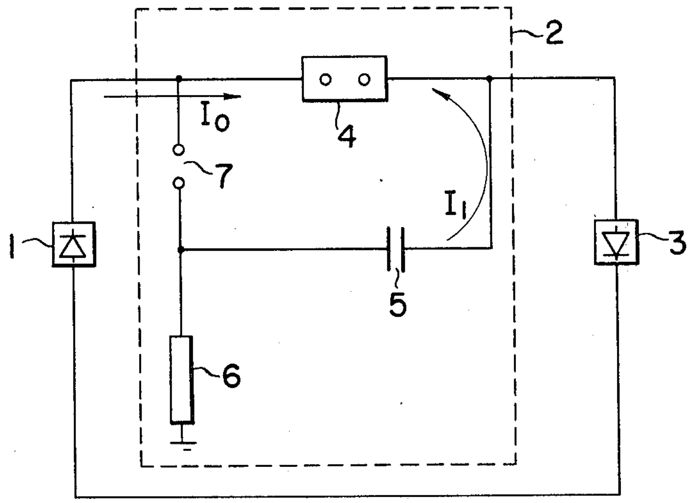
FIG. 3 PRIOR ART
FIG. 3 is a connection diagram showing another conventional DC circuit breaker.
Figure 4:
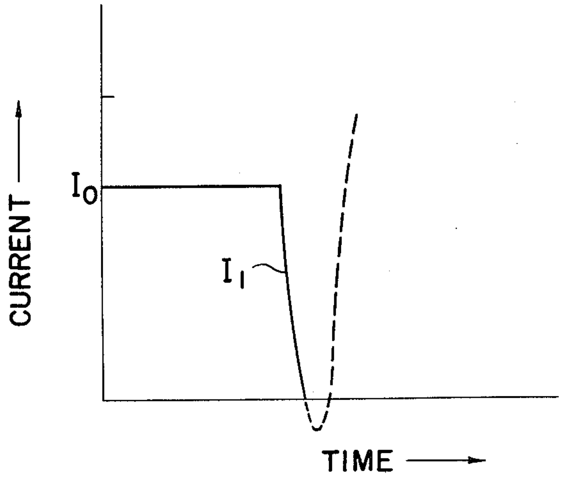
FIG. 4 PRIOR ART
FIG. 4 is a diagram showing a waveform of the current flowing through the circuit breaker shown in FIG. 3.

Opening of the second interrupter 42 varies a main current $I_0$ heretofore flowing through the interrupter 42 into an oscillatory current as shown in FIG. 2. A negative resistance characteristic of the arc intensifies the amplitude of the oscillatory current in accordance with the elapse of time until a zero point is formed in the main current $I_0$. The interrupter 42 generally interrupts the main current flowing therethrough at the zero point.

Where the inductance of the power source (not shown) is high, a high voltage appears across the interruper 42 just after the interruption thereof. This high voltage is applied across the discharge gap 8 through the impedance element 10 with a predetermined delay time.

When the high voltage applied across the gap 8 exceeds a predetermined value, an arc is created across the gap 8. As a consequence, discharge current $I_1$ flows from the capacitor 5 through the arc of the gap 8, the first capacitor 9, and the first interrupter 41 in a direction reverse to that of the main current $I_0$. The reverse current $I_1$ contains a high frequency component which creates a zero point for interrupting the current flowing through the first interrupter 41.

The first capacitor 9 operates as a blocking capacitor which blocks a current flowing in a loop comprising the capacitor 5, the gap 8 and the impedance element 10. Furthermore, the first capacitor 9 delays the high voltage applied across the discharge gap 8.

The first interrupter 41 is not required to create an arc of such a high voltage as in the second interrupter 42, but is required to withstand a high voltage.

With the above described construction of the DC circuit breaker of this embodiment, it is not necessary to charge the capacitor 5 beforehand to the line voltage of the power supply system. The capacitor 5 is automatically charged by the arc voltage of the second interrupter 42 created at the time of the interruption. A reverse current created by the discharge of the capacitor 5 provides a zero point in the current flowing through the interrupter 42, and the interrupter 42 interrupts the current at the zero point. Since the first interrupter 41 capable of withstanding a high voltage is connected in series with the second interrupter 42, the circuit breaker 2 can be used in an extremely high voltage power transmission system.

Figure 6:
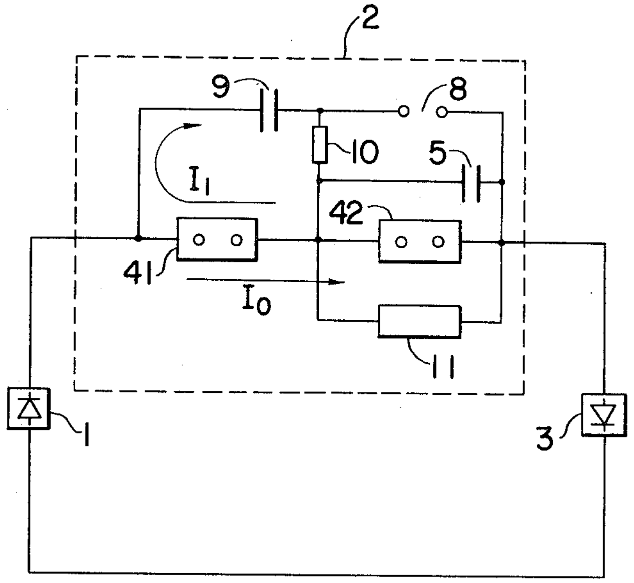
FIG. 6 is a connection diagram showing a second embodiment of this invention.

A second embodiment of the present invention is shown in FIG. 6 wherein like circuite elements are designated by the same reference numerals.

The second embodiment differs from the aforementioned first embodiment in that an overvoltage suppressing device 11 is connected in parallel with the second interrupter 42. The overvoltage suppressing device 11 has a voltage-current characteristic just like an arrestor and suppresses an overvoltage and prevents the occurrence of an abnormal high voltage in the power supply line.

Figure 7:
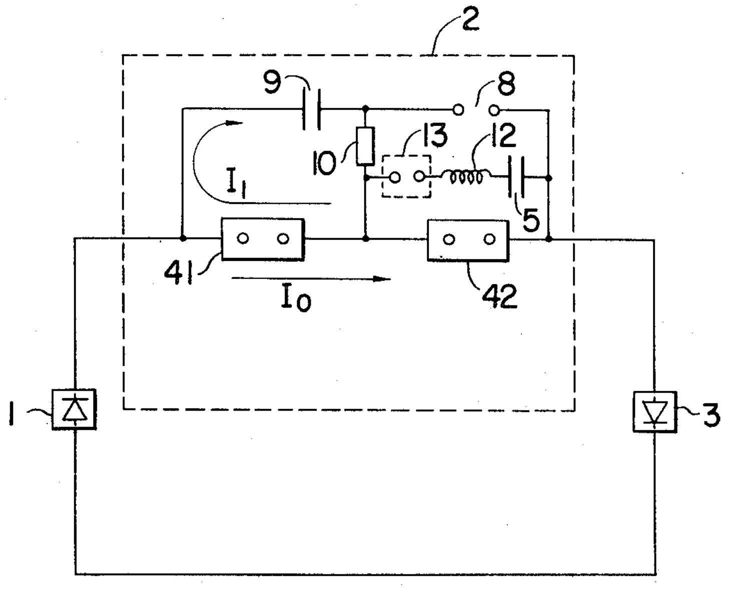
FIGS. 7 through 9 are connection diagrams showing further embodiments of the invention respectively.

FIG. 7 shows a third embodiment of the present invention, wherein like circuit elements are designated by the same reference numerals. In this embodiment, a reactor 12 and a discharge gap 13 are connected in series with the second capacitor 5 and the series circuit is connected in parallel with the second interrupter 42, so that the reactor 12, discharge gap 13, and the capacitor 5 provide a commutation circuit. By the above described arrangement, the impedance of the commutation circuit can be reduced, and the frequency of the oscillatory current can be lowered.

More specifically, the impedance of the commutation circuit which has been maintained at an extremely high value until the discharge gap 13 discharges, is abruptly reduced due to the discharge of the discharge gap 13 and the connection of the not yet charged capacitor 5 and the reactor 12 to the commutation circuit, which are caused by an increased arc voltage of the second interrupter 42. The abrupt reduction of the impedance of the commutation circuit creates an oscillatory current of a large amplitude, and reduces the frequency of the oscillatory current, thus facilitating the interruption of the DC circuit breaker 2. The above described advantageous effect of this embodiment is maintained even in a case where either one of the reactor 12 and the discharge gap 13 is omitted from the commutation circuit.

Figure 8:
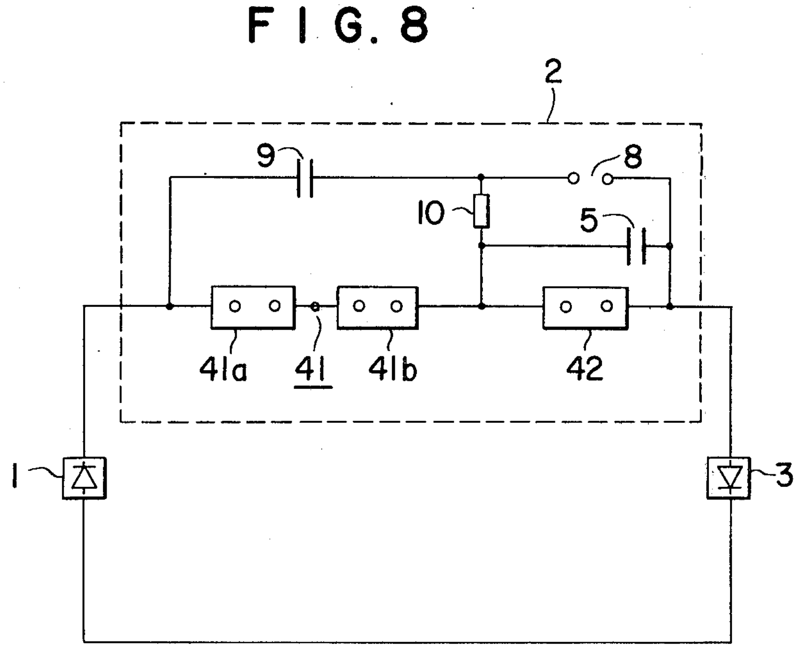

Still another embodiment (fourth embodiment) of the present invention is shown in FIG. 8 wherein like component elements are also designated by the same reference numerals.

In the fourth embodiment, the first interrupter 41 is divided into a plurality of interrupters such as 41*a* and 41*b*. The interrupter 41*a* is preferably a gas filled interrupter having a high arc voltage, while the interrupter 41*b* is preferably a vacuum interrupter.

Ordinarily, when a DC current to be interrupted becomes large, a sharp variation rate of the current is exhibited at the time of the interruption. In order to prevent any harmful effect thereof on the interruption characteristics of the interrupter, the frequency of the oscillation current as shown in FIG. 2 must be lowered. The lowering of the frequency, however, requires a substantial increase in the capacitance and the size of the commutation capacitor 5. A vacuum interrupter has a property capable of interrupting current having an extremely large current variation rate in the proximity of the current zero point. For this reason, the above described arrangement of the embodiment including the vacuum interrupter 41*b* provides a DC circuit breaker having a current interruption characterisitc comparable with that of the conventional DC circuit breaker, without increasing the size of the commutation capacitor 5.

Figure 9:
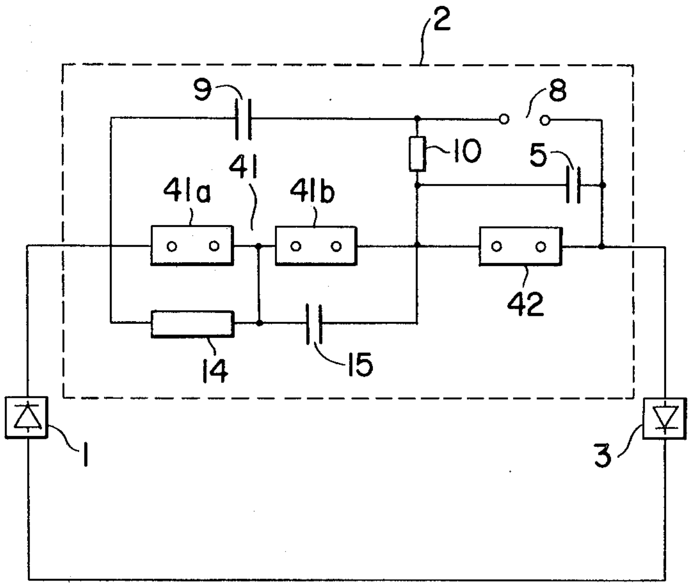

Still another embodiment (fifth embodiment) of the present invention is shown in FIG. 9 wherein like circuit elements are designated by like reference numerals. Alike the previous embodiment, the first interrupter 41 of this embodiment is divided into a plurality of interrupters, for example, two interrupters 41*a* and 41*b*. The interruper 41*a*, preferably of a gas-filled type is connected in parallel with a resistor 14 of a linear or nonlinear resistance type, while the interrupter 41*b*, preferably of a vacuum interruper type is connected in parallel with a capacitor 15.

The characteristic feature of the vacuum interrupter resides in that although the insulation thereof recovers rapidly after interruption of a current, the insulation value thereof is comparatively low. On the other hand, the gas interrupter exhibits a comparatively high insulation value although the recovery rate of the insulation is comparatively slow. For this reason, it is advantageous to use such interrupter combination that the vacuum interrupter withstands an initial portion of a recovering voltage occurring after a current interruption, while the gas interrupter having a delay time withstands the substantially entire recovering voltage.

In this embodiment, the resistor 14 and the capacitor 15 connected in parallel with the gas interrupter 41*a* and the vacuum interrupter 41*b*, respectively, permit to execute the above described operations of the two interrupters. That is, the vacuum interrupter 41*b* withstands the initial portion of the recovering voltage, while the gas interrupter 41*a* having a delay time insulation withstands the substantially entire recovering voltage. With this construction, the characteristic features of the two interrupters can be utilized advantageously, and the capacitance of the commutation capacitor 5 can be reduced.

In either one of the above described embodiments, precharging of the commutation capacitor 5 is not required, whereby a reliable interruption of a DC current can be realized.

We claim:

1. A DC circuit breaker apparatus comprising a first interrupter and a second interrupter connected in series in a DC power supply line, a first capacitor and a discharge gap respectively connected in parallel with said first and second interrupters so that said first capacitor and said discharge gap are connected in series, an impedance element connected between a first junction between said first capacitor and said discharge gap and a second junction between said first and second interrupters, and a second capacitor connected in parallel with said second interrupter.

2. A DC circuit breaker apparatus as set forth in claim 1 which further comprises an overvoltage suppressing element connected in parallel with said second interrupter.

3. A DC circuit breaker apparatus as set forth in claim 1 which further comprises another discharge gap and a reactor connected in series with said second capacitor, so that the impedance of a circuit including said second capacitor is reduced, and the frequency of an oscillatory current in said circuit including said second capacitor is lowered.

4. A DC circuit breaker apparatus as set forth in claim 1 wherein said first interrupter comprises a vacuum interrupter and a gas-filled interrupter which share a recovering voltage across said first interrupter after interruption such that said vacuum interrupter initially withstands a substantial portion of said voltage, and said gas-filled interrupter thereafter withstands a substantial portions of said voltage.

5. A DC circuit breaker apparatus as set forth in claim 4 which further comprises a resistor and a capacitor connected in parallel with said vacuum interrupter and said gas-filled interrupter, respectively, for assuring time-depending sharing of said recovering voltage.

* * * * *